United States Patent [19]

Brafford et al.

[11] Patent Number: 4,844,565
[45] Date of Patent: Jul. 4, 1989

[54] QUICK-RELEASE SPACER-LATCHING-CONNECTOR ASSEMBLY

[75] Inventors: James M. Brafford, Mission Viejo; Ralph H. Maeda, El Toro, both of Calif.

[73] Assignee: Unisys Corporation, Blue Bell, Pa.

[21] Appl. No.: 141,801

[22] Filed: Jan. 11, 1988

[51] Int. Cl.⁴ .............................................. A47B 87/00
[52] U.S. Cl. ..................... 312/107.5; 292/36; 403/254; 403/322; 312/111
[58] Field of Search ............... 312/111, 107.5, 107, 312/296; 403/254, 253, 322, 388; 361/393; 292/36, 139; 248/503, 223.1, 223.2

[56] References Cited

U.S. PATENT DOCUMENTS

| | | | |
|---|---|---|---|
| 813,595 | 2/1906 | Shive | 292/36 |
| 3,731,956 | 5/1973 | Hanley | 312/111 X |
| 3,752,520 | 8/1973 | Sprick et al. | 292/148 |
| 3,926,243 | 12/1975 | Lovich et al. | 292/148 X |
| 4,648,737 | 3/1987 | Lake et al. | 312/107.5 |
| 4,725,029 | 2/1988 | Herve | 248/223.1 |

FOREIGN PATENT DOCUMENTS 2187784 9/1987 United Kingdom ............... 292/148

Primary Examiner—Joseph Falk
Attorney, Agent, or Firm—Alfred W. Kozak; Nathan Cass; Robert S. Bramson

[57] ABSTRACT

A quick-set engaging and release spacer-connector assembly permits two cabinet modules to be fixedly connected side-by-side by manual operation of upper and lower internal lever handles which sit inside the assembly. A lateral drawing force operates to seal the cabinet modules with RFI/EMI gaskets on the periphery of each side of the spacer connector assembly.

12 Claims, 4 Drawing Sheets

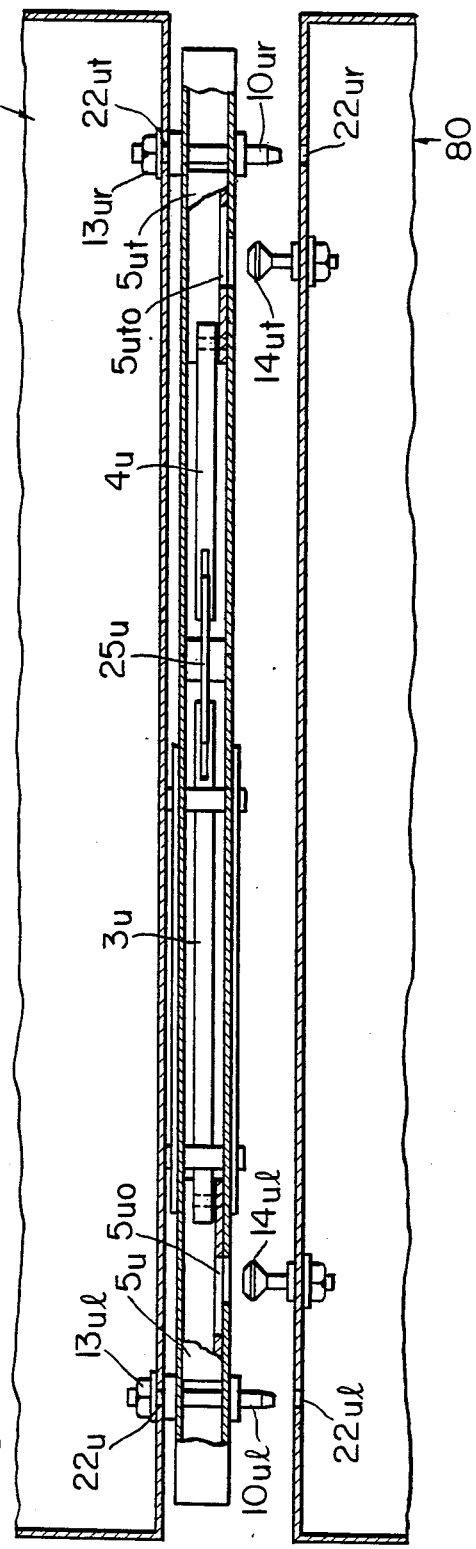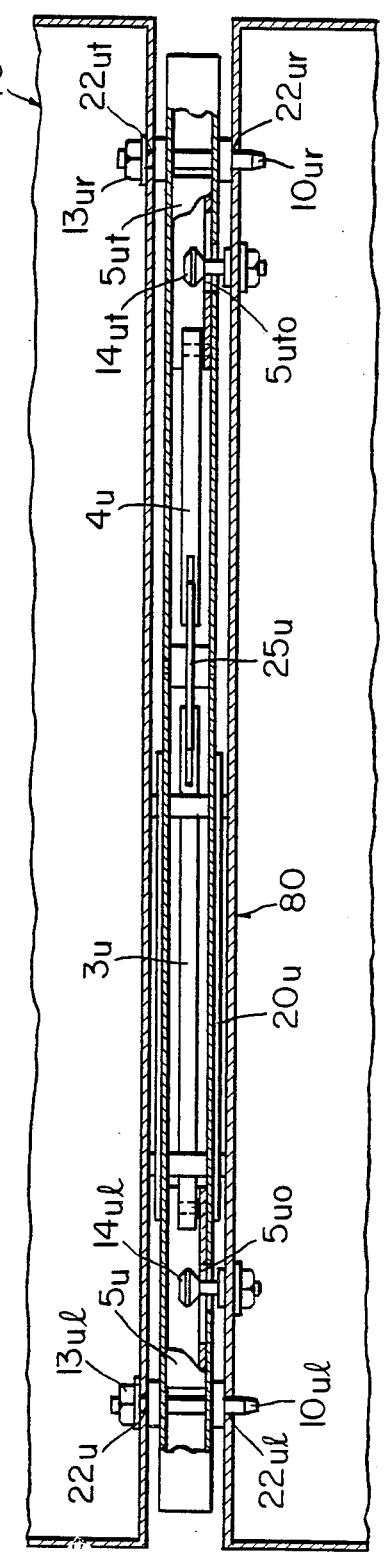

QUICK-RELEASE SPACER-LATCHING-CONNECTOR ASSEMBLY

FIELD OF THE INVENTION

This disclosure involves mechanisms useful for the quick, efficient attachment of volume-enclosing cabinetry or digital modules under conditions where it is often desirable to expand the available volume with compatible cabinetry.

BACKGROUND OF THE INVENTION

In the modern day arts which use digital cabinetry for computer systems, personal computers, work stations, televisions and recording apparatus and other types of digital module cabinetry, it is very often most desirable to attach on additional modules having a compatible configuration in order to expand the capability for additional components and circuitry such as added memory, added disk-drive modules, added computer circuitry, added cooling mechanisms, etc.

In much of the art, added capacity for digital equipment and other electronic components was handled by merely providing a nearby cabinet or module which would then interconnect by cables to the original modules which was to be expanded. This led to many types of problems such as lack of conformity and lack of improper or unavailable methods of shielding for radio frequency interference and electromagnetic interference (RFI/EMI).

Then again, because individual and separate modules were used, there was often, not only a lack of design conformity but also a need for more or larger amounts of floor space to house the associated cabinetry units.

The presently devised spacer-latching connector assembly mechanism overcomes many of these inadequacies and permits compatible types of cabinets or modules to be rapidly attached to each other and connected together in a quick and efficient manner while providing excellent quality of radio frequency interference suppression and electromagnetic interference suppression. Additionally, the assembly also permits a quick release and disconnection of the two or more attached cabinetry modules for ease of internal access to the mechanism involved therein.

SUMMARY OF THE INVENTION

The spacer-latching-connector assembly mechanism of the present disclosure provides a means whereby an independent assembly is provided which can be attached to the side of a cabinet or module, and which permits the ready and easy attachment of a adjacent module.

The spacer-latching assembly will provide a drawing force against a series of latch pins which align into a latch slider and wherein the latch slider is actuated to have a lateral movement which will lock in the latch pin. A set of spacer-latch handles can be manually operated to cause the latch sliders to lock in to the latch pins.

This arrangement provides a drawing force in a lateral direction which latches and locks together the two adjacent cabinets. The motion of the spacer-latch handles provides a drawing force perpendicular to the force applied to the handles and this is accomplished without the need for any cams or springs or specialized screw mechanisms.

The spacer-latching-connector assembly mechanism can be provided with flexible gaskets of RFI/EMI shielding around the periphery thereof which will further seal and protect the connection between the two cabinet modules.

Considerable advantages occur in that only one type of manual hand motion is required in order to draw the cabinets together and latch them with solidity. Additionally, only a relatively small space is required to house the mechanism and this type of mechanism can be used with almost any type of cabinet configuration. Further, the force required to effect any motion of the quick-release latch can be applied from either inside the spacer enclosure or from outside the spacer enclosure.

BRIEF DESCRIPTION OF THE DRAWINGS

FIG. 5 is an illustration (top view) showing how the first and second cabinet modules are aligned for connective attachment using the spacer-latching-connector assembly.

FIG. 6 is a top plan view of the assembly of FIG. 3 showing pin alignment prior to latching.

DESCRIPTION OF PREFERRED EMBODIMENT

Figure 1:
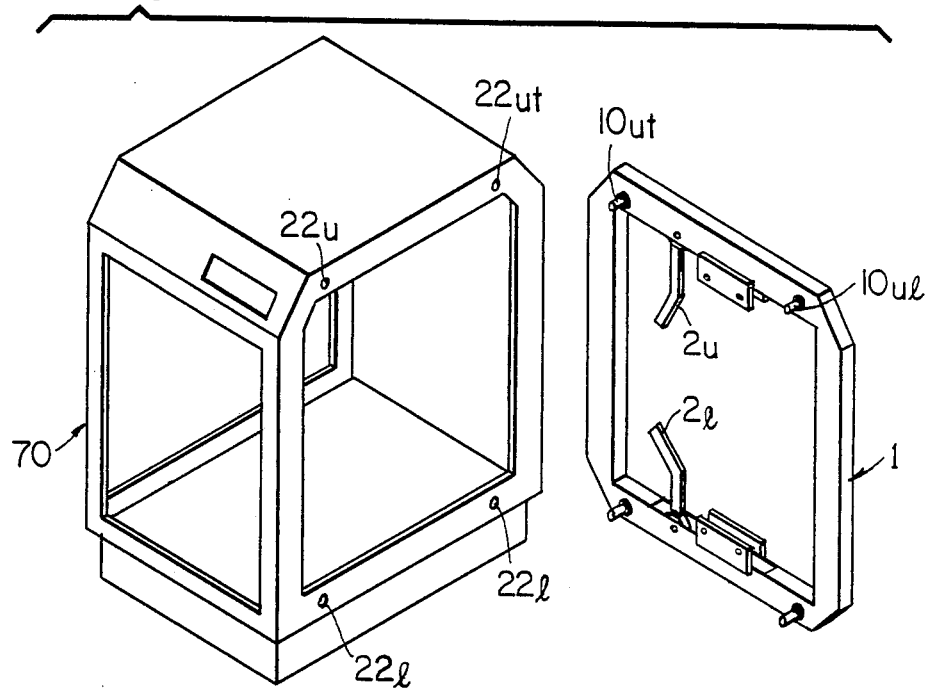
FIG. 1 is an illustration of a side view of an electronic digital equipment module showing one side thereof against which there is abutting the presently described quick-release spacer latching connector mechanism.

FIG. 1 illustrates a typical cabinet or digital module 70 to which it may be desired to attach another similar digital module 80. In this regard the FIG. 1 also indicates at the right side thereof the spacer-latching-connector assembly 1 which will be described in greater detail in connection with FIG. 4.

Figure 2:
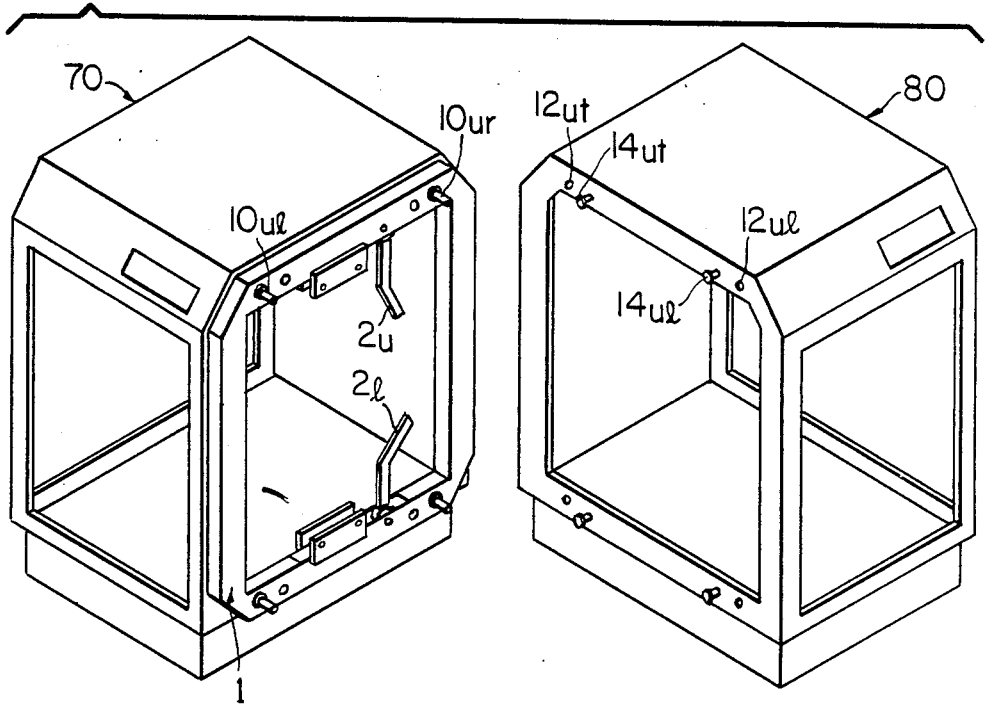
FIG. 2 is an illustration of the spacer latching mechanism mounted on one digital module and the proximity of a second digital module which will be connected thereto.

FIG. 2 is an illustration of the spacer-latching-connector assembly 1 mounted on the first digital module 70 on the left-hand side of the illustration and showing another similar digital module 80 which is being placed into position for attachment to the first digital module. As seen in FIGS. 2 and 5, alignment pins $10_{ul}$ and $10_{ur}$ will insert into alignment holes $12_{ul}$ and $12_{ur}$.

Figure 3:
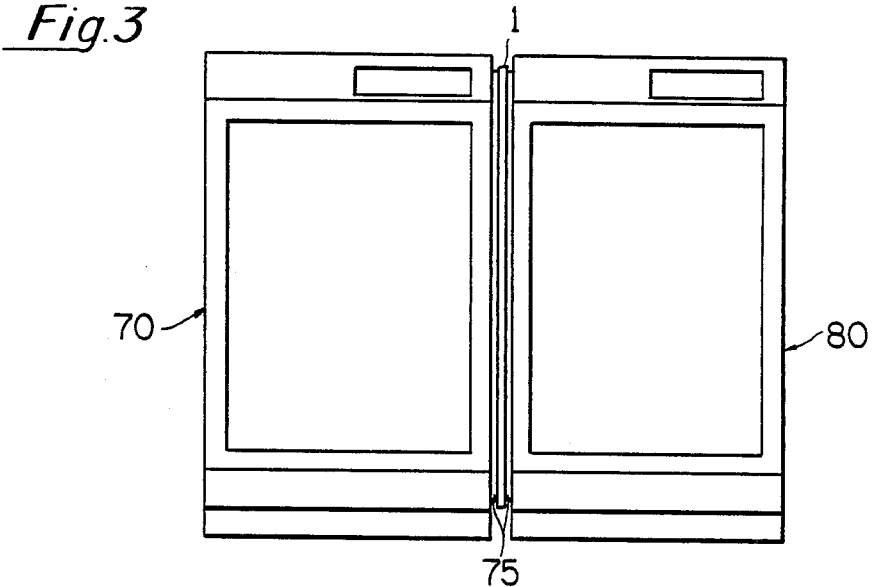
FIG. 3 is an illustration showing the co-joined attachment of the first and second digital module with the RFI/EMI shielding on either side of the assembly.

FIG. 3 is a side-view, close-up illustration showing how the two modules, that is the first module 70 on the left-hand side and the second module 80 on the right-hand side have now been connected together with further indication showing how the RFI/EMI gasketing has been pressed on either side of the latching connector assembly 1.

Figure 4:
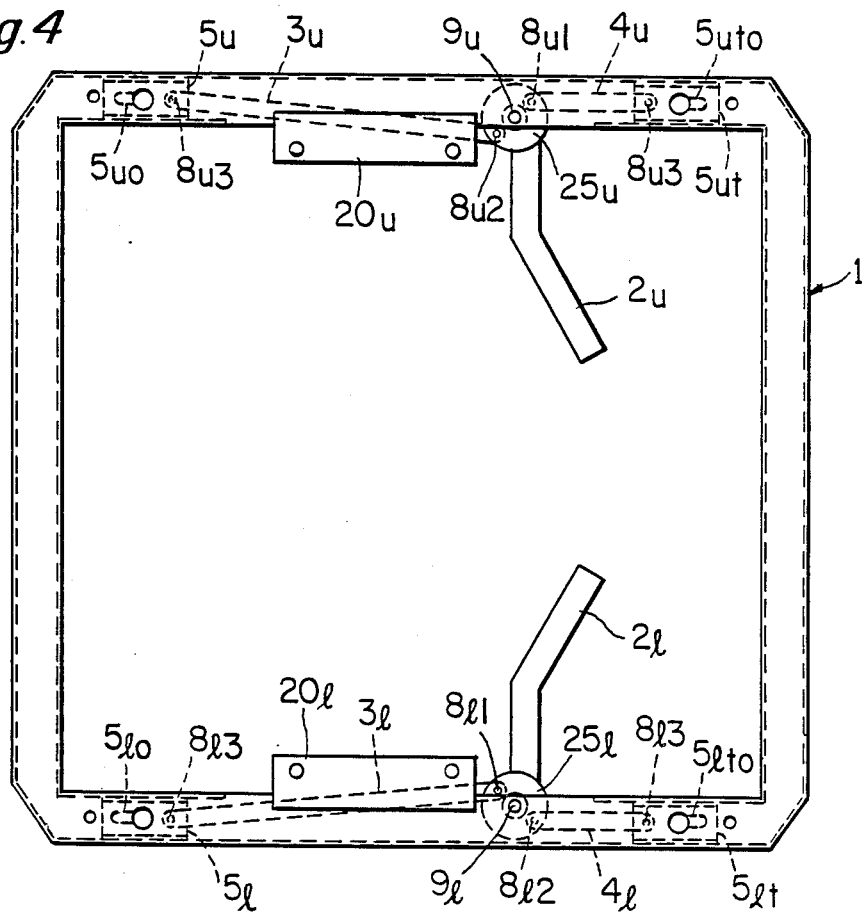
FIG. 4 is an illustration of the side view of the quick-release spacer-latching-connector assembly mechanism in the unlatched position.

Referring to FIG. 4, there is seen a side view of the spacer-latching-connector assembly mechanism 1.

A rectangular, metallic, spacer cabinet frame 1 provides the basis for the overall structure. The upper section of the cabinet frame structure provides a series of mechanical elements which permit, by manual operation, a latch slider such as $5_u$ and $5_{ut}$ to respectively engage a set of tapered latch screws $14_{ul}$ and $14_{ur}$ shown on FIG. 6 of the top plan view.

This is accomplished after the alignment pins $10_{ul}$ and $10_{ur}$ of FIG. 6 have been properly aligned into the alignment holes 12ul and $12_{ut}$ shown at the top of the frame of module 80 in FIG. 2.

The upper operating mechanism shown in FIG. 4 involves a manually operated latch handle $2_u$ which is fixedly connected to a rotating disk unit $25_u$. Then, connected to the outer edges of the disk $25_u$ is a spacer latch arm $4_u$ and also an operating latch arm $3_u$. A screw/lock nut $8_{ul}$ connects the spacer latch arm $4_u$ to the disk $25_u$.

Similarly a second screw/lock nut $8_{u2}$ connects the operating latch arm $3_u$ to the disk $25_u$.

A guide bracket and wall support $20_u$ provides a guiding channel (FIG. 4) for the operating latch arm $3_u$. When attached, by pin $8_{u3}$, the latch arm $3_u$ can activate or slide the latch slider $5_u$ causing the tapered opening $5_{uo}$ to engage and lock onto the tapered latch screw $14_{ul}$ (FIG. 6). Likewise, wall support $20_l$ (FIG. 4) is the lower counterpart of the upper bracket and wall support $20_u$.

Thus, when the latch handle $2_u$ is operated in the upward direction, the spacer-latch arm $4_u$, will operate the latch slider $5_{ut}$ to engage the tapered latch screw $14_{ut}$ (FIG. 6) into a locked position while the latch arm $3_u$ will operate the latch slider $5_u$ to engage the tapered latch screw $14_{ul}$ into locked position.

A similar mechanical operating condition occurs at the bottom section of the spacer frame 1. Here again there is seen a second spacer-latch handle $2_l$ controlling the spacer-latch arm $4_l$ thus causing the respectively subsequent sliding action of the latch slider $5_{lt}$ to engage and lock a similar tapered latch screw in the opening $5_{lto}$ of slider $5_{lt}$.

This sliding action will also engage another lower tapered latch screw in opening $5_{lo}$ of slider $5_l$ similar to that described in conjunction with the upper set of tapered latch screws $14_{ul}$ and $14_{ur}$.

As seen in FIG. 4, the rotating disk units $25_u$ and $25_1$ have components $8_{l1}$, $8_{l2}$ plus $8_{ul}$ and $8_{u2}$ which are tensioning devices which serve to insure that the locked positions and unlocked positions of handles $2_u$ and $2_l$ will hold firmly without loosening.

As in the upper section of the assembly frame 1, there is a corresponding lower guide bracket $20_1$ which guides the operating latch arm $3_l$.

It should be noted that the tapered latch screws $14_{ul}$ and $14_{ur}$ and also the corresponding two lower tapered latch screws which are involved in the assembly, are actually located in the cabinets modules as seen in FIG. 6 where module 80 carries the tapered latch screws $14_{ul}$ and $14_{ur}$. Then when the alignment pins $10_{ul}$, and $10_{ur}$ are inserted into the cabinet module 80, then, at this time, the tapered latch screws such as $14_{ul}$ and $14_{ur}$ will then position themselves into the widest part of the tapered openings such as $5_{uo}$ and $5_{uto}$ of FIG. 4. After these tapered latch screws 14 (FIG. 5) have been inserted into the wide portion of the tapered opening, then the manual action of the spacer-latch handles $2_u$ and $2_l$ can be used to move the latch slider so as to operate against the tapered latch screws in order to cause a compressing or lateral force action which locks the cabinets together.

This can be illustrated with reference to FIG. 7 and the three sections thereof labeled FIG. 7A, FIG. 7B, and FIG. 7C.

Figure 7A:
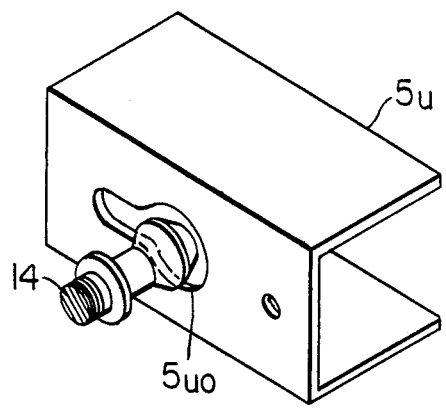
FIG. 7 is a drawing showing three phases designated as FIG. 7A, FIG. 7B, and FIG. 7C which indicate the locking relationship between the latch slider and the tapered latch pin of the spacer-latching-connector assembly of FIG. 4.

As seen in FIG. 7A, the tapered latch screw (14 of FIG. 5 and $14_{ul}$, $14_{ur}$ of FIG. 6) is aligned to fit right into the widest portion of the tapered opening $5_{uo}$. Subsequently, as shown in FIG. 7B, the latch sliders $5_u$ (and $5_{ut}$) are moved, by means of manual action of the handle such as $2_u$ and the latch slider imposes its smaller tapered opening onto the tapered latch screw 14 causing the screw 14 to pull the cabinet structure 80 in tight proximity against the spacer-latching-connector assembly mechanism so that a tightly sealed and solid mechanical connection will exist between the cabinet 80 and the assembly frame 1 which also seals the EMI/RFI shielding shown in FIG. 3 as element 75.

Figure 7B:
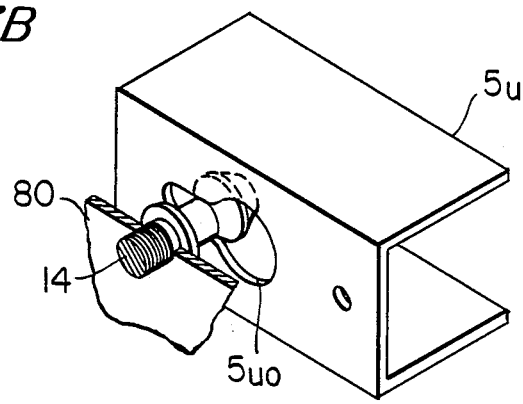
Figure 7C:
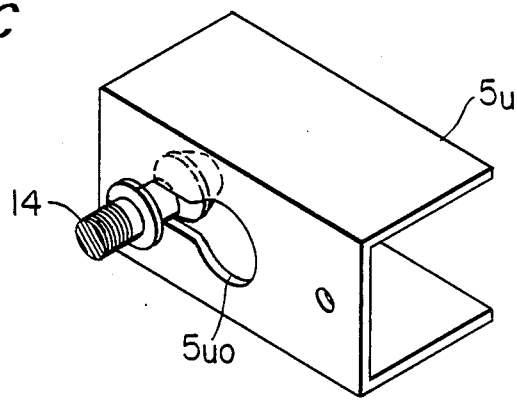

As seen in FIG. 7C, the motion of the latch slider $5_u$ has reached its extreme position, thus pulling and forcing in the tapered latch screw 14 which pulls the cabinet 80 against the frame assembly 1 of FIG. 4.

FIG. 5 is a top plan view illustrating how a first digital module or cabinet shown as Cabinet 70, has had attached to it the spacer-latching-connector assembly 1 and how a second digital module or cabinet 80 is then juxtaposed for subsequent connection to the first cabinet 70 via the assembly 1. It should be noted that the second cabinet or digital module 80 is provided with tapered latch screws 14 which will be inserted into the four latch slider openings $5_{uo}$, $5_{uto}$, $5_{lo}$ and $5_{lto}$ as was discussed in connection with FIG. 4.

Referring to FIG. 6, there is seen the cabinet frame 70 of the first digital module or cabinet. Attached to this first cabinet 70, is the spacer-latching-connector assembly 1 having its alignment pins $10_{ul}$ and $10_{ur}$ which fit into the alignment holes of the second cabinet or digital module 80. The tapered latch screws $14_{ul}$ and $14_{ur}$ of the cabinet 80 will be pulled into compressive juxtaposition by the sliders $5_u$ and $5_{ut}$ when latch handle $2_u$ is pushed into the horizontal position.

Corresponding to what was shown in FIG. 4, the top plan view of FIG. 6 shows the rotating disk $25_u$ which operates the latch arm $4_u$ and the operating latch arm $3_u$ in order to move the sliders 5u and $5_{ut}$ causing the tapered latch screws $14_{ul}$ and $14_{ur}$ to be forced into perpendicular motion as shown in FIGS. 7A, 7B and 7C.

In FIG. 1, when the spacer-latching-connector assembly 1 is first installed, the assembly 1 is fixed bolted to module 70 via lock bolts $13_{ul}$ and $13_{ur}$ (also seen in FIGS. 5 and 6) which fit through the openings $22_u$ and $22_{ut}$. Likewise, bottom bolts are placed through openings $22_l$ and $22_{lt}$ of FIG. 1.

As seen in FIG. 5, the tapered latch screws 14 are mounted on one cabinet such as cabinet 80 while the spacer-latching-connector assembly 1 is mounted on the other cabinet or module 70.

Functionally, as per FIG. 7, one cabinet 80 is pulled inward toward the other cabinet 70 until the tapered latch screws 14 have entered the openings of the latch sliders. At this point, by pushing handle $2_u$ upward and handle $2_l$ downward, the sliders $5_u$, $5_{ut}$, $5_l$, and $5_{lt}$ are forced to slide which, in turn, pulls the two cabinets together and ultimately latches them in a very solid, fixated connection. Thus, the condition shown in FIG. 5 then consumates into the solidly latched and locked juxtaposition shown in FIGS. 3 and 6.

In order to disengage the cabinets, the handle 2u is pulled down to vertical while handle $2_l$ is pulled up to vertical and thus the spacer latch handles 2 of FIG. 4, are used to move the latch sliders 5 in the outboard direction until the "large diameter" of the "keyhole" opening is in line with the central axis of the tapered latch screws 14. At this juncture or point in time, the two cabinets 70 and 80 can then be pulled apart and separated.

Two of the principal activating devices in the spacer-latching-connector assembly are the tapered latch screws 14 and the cabinet spacer latch 5 or latch sliders 5. These two elements work in a cooperative manner in that each of these two elements is tapered in a different plane which are perpendicular to each other. The tapered latch screw 14 has an exterior taper while the cabinet spacer latch 5 (latch slider 5) has an interior taper.

Thus, these two cooperating elements can function as follows (referring to FIGS. 4 and 7A, 7B, and 7C):

The relative positions are placed such that the "keyhole" opening ($5_{uo}$, $5_{uto}$, $5_{lo}$, $5_{lto}$) of the cabinet spacer latch slider 5 is perpendicular to the tapered latch screws 14.

The tapered leading edge of the tapered latch screw 14 locates itself in the larger diameter opening ($5_{uo}$, $5_{uto}$, $5_{lo}$, and $5_{lto}$) of the latch sliders 5.

When a force is exerted to effect movement of the latch slider 5, such that the taper of the "keyhole" opening is diminishing the keyhole size, then the tapered screw 14 is pulled in a direction perpendicular to that of the applied force through movement of the spacer latch handle 2, due to positional change from vertical (unlocked) to horizontal (locked). This is illustrated in FIGS. 4 and 7A, 7B, and 7C.

Once the latch slider (cabinet spacer latch 5) has moved a sufficient distance to pull the tapered latch screw 14 into the untapered region of the "keyhole opening" of the latch slider 5, then the pulling or drawing phase ceases and the tapered screw 14 is now latched tightly and firmly into the cabinet spacer latch (latch slider 5).

In general, the basic requirements of a reliable spacer-connector mechanism are (i) structural integrity, (ii) provision of adequate electromagnetic shielding and radio frequency interference sealing, (iii) ease of installation and removal, (iv) noninterference with the contents of the associated and attached cabinets, (v) the accuracy of positioning the two cabinets which are joined.

Because of the stringent requirements involved, the present latch assembly and mechanism has provided the following features:

(1) The spacer-connector assembly is able to pull or draw the cabinets together while providing and compressing a gasket for EMI/RFI shielding.

(2) The assembly provides a positively firm and solid latch between the two cabinets in their joined position.

(3) The spacer-latching connector assembly will repeatedly align the cabinets into alignment when they are joined.

(4) The operating mechanisms of the spacer and latching mechanism are contained within the assembly itself. There is no interference to the cabinet interiors. The only additives required are to the exterior of the cabinets whereby one cabinet will mount the four peripheral tapered latch screws which are used for insertion into the tapered keyhole openings of the spacer assembly.

(5) The method or technique of activating or engaging the latch slider mechanisms must be flexible enough to allow access from the exterior of the cabinets or from the interior of the cabinets. This is provided in the configuration of FIG. 4 by means of the spacer-latch handles $2_u$ and $2_l$ which can be manually activated in the same plane of motion as the plane of the entire assembly of FIG. 4 without any intrusion into the attached cabinets.

The present disclosure has presented a readily attachable spacer-latching-connector assembly mechanism which can be attached to a first cabinet or digital module to enable the simple expeditious attachment of another or digital module to the first in a most efficient manner. An upper and lower activating mechanism of the spacer-latching-connector assembly provides manually operating handles which operate in the same plane of the assembly, and which enable a set of peripherally emplaced sliders to latch onto and pull in a set of tapered set of latch screws so that both cabinets are joined in a firm and reliable fashion and this is accomplished in a rapid, easily accomplished manner with no need for specialized tools or specialized mechanical attachments and other operations. Likewise, detachment of the modules is easily, quickly, and efficiently done without any need for any mechanical tools or other disassembly of various attachments.

While other embodiments of the above described principles may be used to accomplish similar purposes, it is to be understood that the present disclosure and features and their equivalents are to be encompressed by the following claims.

What is claimed is:

1. A frame assembly for bolting to the side of a first cabinet module to facilitate the rapid attachment/detachment of a second cabinet module having one contiguous side face, and having a plurality of tapered latch screws extending outward toward said frame assembly which is mounted on said first cabinet module, said frame assembly comprising:
  (a) a rigid peripheral frame unit bolted to the periphery of one side face of said first cabinet module, said frame unit including:
    (a1) a plurality of moveable slider means in said frame unit wherein each said slider means carries a keyhole plate having a major diameter opening which tapers into a minor diameter opening, and wherein each said slider means has an open position whereby each of said tapered latch screws aligns with said major diameter opening of each keyhole plate when said one contiguous side face of said second cabinet module is pressed in alignment against the said peripheral frame unit bolted to said first cabinet module;
    (a2) means for moving said slider means and keyhole plate to engage and lock each of said tapered latch screws, causing the said second cabinet module to be sealed against said frame unit;
  (b) said second cabinet module holding said tapered latch screws and having alignment holes for connective juxtaposition to said frame unit to align said tapered latch screws into the said major diameter opening of said keyhole plate of said slider means when said first and second lever arms are placed in the said open position so that motion, of said first and second lever arms, opposite to said open position, will force said tapered latch screws into said minor diameter opening causing said second cabinet module to be rigidly connected to said peripheral frame unit.

2. The frame assembly of claim 1 which includes:
   (a) first and second layer of RFI/EMI gasketing placed on each side of the periphery of said frame assembly for sealing against said peripheral side face of said first cabinet module and for sealing against said contiguous side face of said second cabinet module.

3. The frame assembly of claim 1 wherein said means for moving said slider means includes:
   (a) first and second lever arm means movable from an open position to a closed position, said first lever arm means controlling a plurality of upper slider means with a first set of said keyhole plates, and said second lever arm means controlling a plurality of lower slider means with a second set of said keyhole plates.

4. The frame assembly of claim 3 wherein each said lever arm means includes:
   (a) a manually movable lever arm which rotates a rotatable disk unit;
   (b) first and second latch arms attached to said rotatable disk unit and to said movable slider means which includes a first and second slider unit means;
   (c) tensioned holding means connecting said first and second latch arms to said rotatable disk unit and functioning to respectively hold said first and second slider unit means at the position they have been moved into.

5. The frame assembly of claim 1 wherein said second cabinet module provides alignment holes for alignment with alignment pins on said frame assembly bolted to said first cabinet module.

6. A frame assembly, in attachment to a first cabinet, for connecting said first cabinet to a second cabinet wherein said second cabinet holds a plurality of alignment holes and a plurality of tapered latch screws, which can be juxtaposed to said frame assembly, said frame assembly comprising:
   (a) a rigid frame unit for peripheral interconnection to one side of said first cabinet, said frame unit including:
      (a1) a plurality of alignment pins for insertion into said alignment holes in said second cabinet;
      (a2) a plurality of latch sliders, connected to slide within said frame unit, each slider having a keyhole opening tapered from maximum open portion to minimal open portion whereby the maximum size opening portion in said keyhole opening is placed in alignment with said plurality of tapered latch screws in the unlocked position;
      (a3) activation means, having locked and unlocked positions, for sliding each of said latch sliders from an unlocked position, in a direction so as to force said tapered latch screws to be locked into the minimal size opening portion of said keyhole opening whereupon said sliders are fixed in a locked position;
   (b) said first cabinet having one side for holding said rigid frame unit; and
   (c) said second cabinet having one side provided with said tapered latch screws and alignment holes for connective juxtaposition to said rigid frame unit so as to align said tapered latch screws into the maximum size keyhole opening of said latch sliders, when said activation means is placed in the unlocked position and functioning so that, when said activation means is placed in the locked position, said tapered latch screws will force said second cabinet to be contiguously connected to said rigid frame unit.

7. The assembly of claim 5 wherein said rigid frame unit includes:
   (a) an upper horizontal slide channel for enabling said activation means to cause a horizontal sliding motion of each of a first and second latch slider unit in said upper horizontal slide channel;
   (b) a lower horizontal slide channel for enabling said activation means to cause a horizontal sliding motion of each of a third and fourth latch slider unit in said lower slide channel.

8. The assembly of claim 7 wherein said activation means includes:
   (a) a rotatable disk unit connected to rotate to move a first and second operating latch arm;
   (b) lever handle means attached to said rotatable disk unit for manual rotation of said disk unit, said handle means having a normal inactivated position which permits alignment of said maximum opening in said latch sliders with corresponding ones of said tapered latch screws;
   (c) said first and second operating latch arms connected to cause said first and second latch sliders to slide horizontally when said lever handle means is moved from its unlocked position to its activated locked position;
   (d) each of said latch sliders being moved during activation of said lever handle means to cause said tapered keyhole opening to force said tapered latch screws, on said second cabinet, to become laterally pressed against said frame assembly.

9. The assembly of claim 8 wherein each side of said frame unit includes:
   (a) strips of RFI/EMI gasketing placed along the outer periphery of said frame unit to provide an airtight seal between the said frame unit and said first and second cabinets.

10. A coupling arrangement comprising:
   (a) a first cabinet module having a first side face whose periphery provides apertures for the bolting thereto of a connector-assembly;
   (b) a second cabinet module having extended tapered latch screws on the periphery of one second side face thereof for alignment and connection to a connector-assembly whereby a plurality of tapered latch screws align with the maximum opening portion of a connector-assembly keyhole sliding means in an unlocked position, and whereupon activation of a connector-assembly lever means, to a locked position, operates to engage said tapered latch screws into a minimum opening portion of said keyhole sliding means in order to rigidly lock said second cabinet module onto said connector-assembly and said first cabinet module;
   (c) said connector-assembly placed for rigid connection to said first side face of said first cabinet module, said connector-assembly including:
      (c1) a peripheral rigid frame unit in contiguous attachment to said first side face of said first cabinet module;
      (c2) said lever means, in said connector-assembly, including: a first positioning lever and a second positioning lever for actuating said keyhole sliding means into a locked position or an unlocked position;
      (c3) said keyhole sliding means, in said connector-assembly, providing a tapered opening configured with a maximum opening portion and a minimum opening portion for engaging said tapered latch screws so as to compress or release the tension between said connector-assembly and said second cabinet module.

11. A frame assembly for bolting to the side of a first cabinet module to facilitate the rapid attachment/detachment of a second cabinet module having a plurality of tapered latch screws extending outward toward said frame assembly which is fixedly mounted on said first cabinet module, said frame assembly comprising:

(a) a rigid peripheral frame unit bolted to the periphery of one side of said first cabinet module, said frame unit including:
 (a1) a plurality of movable slider means in said frame unit wherein each said slider means includes:
  (i) a keyhole plate having a major diameter opening which tapers into a minor diameter opening;
  (ii) an open position whereby each of said tapered latch screws aligns with said major diameter opening of each keyhole plate when one side of said second cabinet module is pressed in alignment against the said peripheral frame unit mounted on said first cabinet module;
  (iii) a closed position wherein each of said tapered latch screws is pressed into said minor diameter opening causing said second cabinet module to be compressedly attached to said peripheral frame unit;
 (a2) means for moving said slider means and keyhole plate to pull in and lock each of said tapered latch screws, causing the said second cabinet module to be sealed against said frame unit, and wherein said means for moving said slider means includes:
  (a2a) first and second lever arm means movable from said open position to said closed position, said first lever arm means controlling a plurality of upper slider means with said keyhole plates, and said second lever arm means controlling a plurality of lower slider means with said keyhole plates, each said lever arm means including:
   (i) a manually movable lever arm which rotates a rotatable disk unit;
   (ii) first and second latch arms attached to said disk unit and to first and second slider means;
   (iii) tensioned holding means connecting said first and second latch arms to said rotatable disk unit and functioning to hold said slider means at the position they have been moved into;
(b) said second cabinet module holding said tapered latch screws and alignment holes for connective juxtaposition to said frame unit to align said latch screws into the maximum diameter opening of said keyhole plate of said slider means when said first and second lever arms are placed in the said open position and wherein, when said first and second lever arms are placed in the said closed position, the said keyhole plates will force said tapered latch screws into said minor diameter opening causing said second cabinet module to be rigidly connected to said peripheral frame unit.

12. A spacer frame assembly for enabling rapid and simple engagement or disengagement between a first cabinet module, having said spacer frame assembly rigidly attached to it, and a second cabinet module having a second side face which mounts a plurality of tapered latch screws for insertion and locking into said spacer frame assembly, said spacer frame assembly comprising:

(a) a rigid frame unit for interconnection to one side of said first cabinet module and including a plurality of alignment holes;
(b) latching connector means for engaging said plurality of tapered latch screws so as to effectuate a lateral compressive force between said second cabinet side face and said spacer frame assembly; said latching connector means including:
 (b1) a plurality of latch slider means wherein each of said latch slider means includes:
  (b1a) a tapered keyhole opening having a major gap opening and a minor gap opening;
  (b1b) levered arm connection means to an activation means;
  (b1c) and wherein said major gap opening is placed in alignment with corresponding ones of said tapered latch screws on said second cabinet module before activation of said activation means.
(c) said activation means for causing said latching connector means to engage onto or disengage from said tapered latch screws to establish a locked or an unlocked condition, said activation means including:
 (c1) an upper and lower rotatable disk which can be rotated respectively by an upper and lower manual lever handle;
 (c2) said upper and lower lever handles being respectively connected to said upper and lower rotatable disks and wherein each said lever handle and rotatable disk has an inactive position and an activated position;
 (c3) upper and lower lever arm connection means linking said respective upper and lower disks to a pair of upper latch slider means and a pair of lower latch slider means respectively for engagement/disengagement of said corresponding tapered latch screws via said minor and major keyhole gap openings;
 (c4) and wherein said inactive position of each of said lever handles and rotatable disks permits each corresponding tapered latch screws to align with said major gap opening;
 (c5) and wherein said activated position operates to laterally pull in each of said corresponding tapered latch screws and said side of said second cabinet module tightly against said spacer frame assembly;
 (c6) and wherein each side of said spacer frame assembly has a RFI/EMI gasket mounted around the peripheral area thereof;
(d) said first cabinet module having a first side face for interconnecting said rigid frame unit; and
(e) said second cabinet module having said second side face for mounting said plurality of tapered latch screws for insertion and locking into said spacer frame assembly, said locking occurring upon action of said activation means in engaging and grasping said tapered latch screws to hold said second cabinet module connected to said rigid frame unit.

* * * * *